April 10, 1951     B. F. ARPS     2,548,461
REVERSE SCOOP ATTACHMENT FOR TRACTORS
Filed March 18, 1946     3 Sheets-Sheet 1
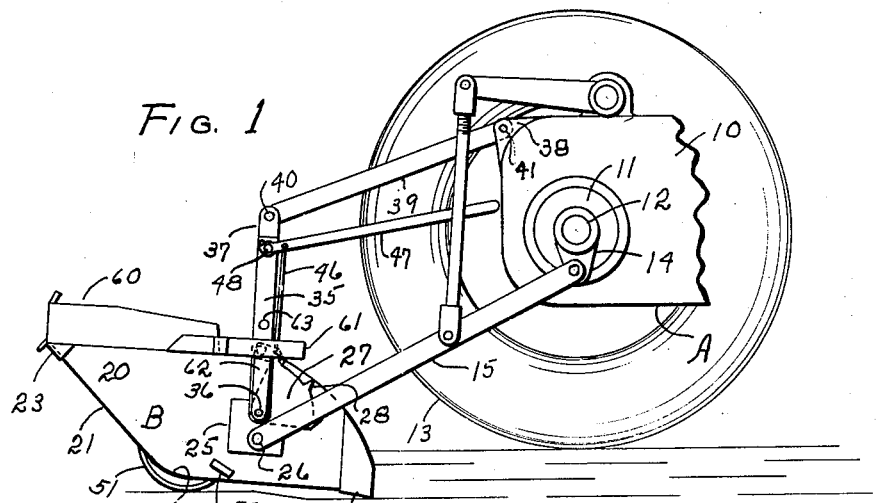
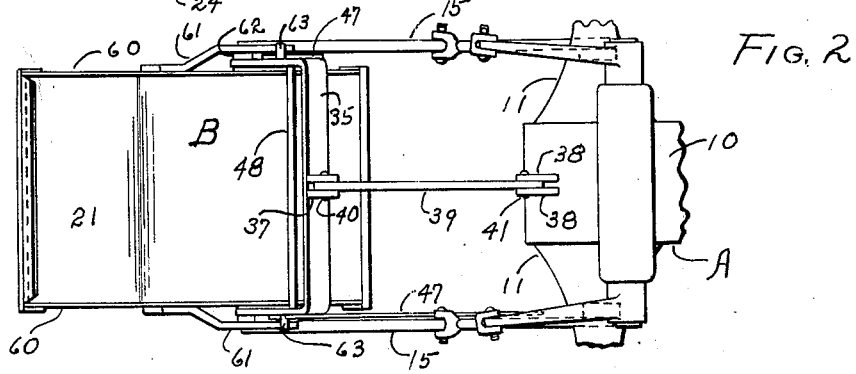
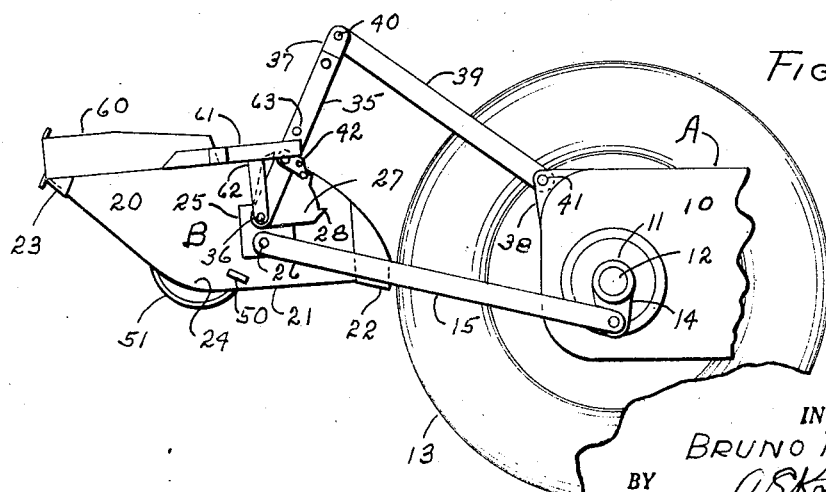
INVENTOR.
BRUNO F. ARPS
BY A. S. Kroh
ATTORNEY April 10, 1951 B. F. ARPS 2,548,461
REVERSE SCOOP ATTACHMENT FOR TRACTORS
Filed March 18, 1946 3 Sheets-Sheet 2

INVENTOR.
BRUNO F. ARPS
BY A. Skroh
ATTORNEY

April 10, 1951 — B. F. ARPS — 2,548,461
REVERSE SCOOP ATTACHMENT FOR TRACTORS

Filed March 18, 1946 — 3 Sheets-Sheet 3

INVENTOR.
BRUNO F. ARPS
BY A. S. Kroh
ATTORNEY

Patented Apr. 10, 1951

2,548,461

UNITED STATES PATENT OFFICE 2,548,461

REVERSE SCOOP ATTACHMENT FOR TRACTORS

Bruno F. Arps, New Holstein, Wis.

Application March 18, 1946, Serial No. 655,134

4 Claims. (Cl. 37—128)

The present invention generally relates to a scoop which is designed to be loaded from the front and dumped from the rear.

Objects of the present invention are to provide a dump scoop which has operating advantages over the conventional scoop which loads from in front and dumps from in front and a scoop which can be easily attached to a tractor, is light and strong and can be manufactured at low cost.

Another object of the present invention is to provide a scoop which can be loaded from the rear and dumped from the rear and used for moving material rearwardly bulldozerlike.

A further object of the present invention is to provide a scoop which can be used for spreading the material after it has been dumped either forwardly or rearwardly.

To these and other useful ends my invention consists of parts, combinations of parts or their equivalents and mode of operation as hereinafter described and claimed and shown in the accompanying drawings in which:

Fig. 1 illustrates my device as it is attached to a conventional tractor and being shown in a loading position while traveling forward.

Fig. 2 is a top view of the device as shown in Figure 1.

Fig. 3 illustrates the device shown in Figure 1 after being lifted and for transporting the load.

Figure 4:
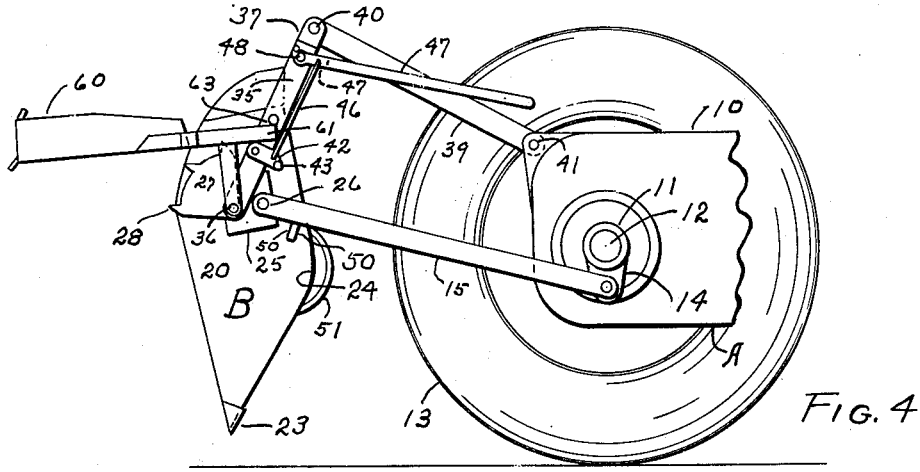
Fig. 4 illustrates the device after the load has been dumped.

As thus illustrated the tractor is designated by reference character A; the scoop in Figures 1 through 4 in its entirety is designated by reference character B. The scoop in Figures 5 through 9 in its entirety is designated by reference character C. The frame 10 of the tractor at the rear is provided with outwardly extending axle housings 11—11 having axle shafts 12 which protrude through these housings and having mounted on their outer ends ground wheels 13.

I provide preferably downwardly extending brackets 14 to which the front ends of drawbars 15—15 are pivotally connected. The tractor is provided with a power lift (as shown in Figures 1 and 2) having connections to members 15 intermediate their ends whereby the drawbars may be raised and lowered.

Scoops B and C comprises side plates 20—20 and a bottom plate 21. The side plates 20 are shaped at their edges about as shown in the figures. Member 21 is provided with a front cutting blade 22 and a rear cutting blade 23.

It will be noted that member 21 is provided with a large radius curve as at 24 so as not to obstruct the free forward or rearward movement of the material when loading and dumping. On side plates 20 I provide strengthening plates 25—25 to which the rear ends of members 15 are pivotally secured as at 26. Members 20 are provided with ratchet plates 27—27 having projections 28.

I provide an inverted U-shaped bracket 35, the ends of the legs of which are pivoted to members 25 as at 36—36. On the upper cross member of member 35 I secure intermediate its ends a bracket 37. Projections 38—38 are provided on member 10. A push bar 39 is pivoted at its ends to members 37 and 38 as at 40 and 41. Thus member 35 provides a connection between members 15 and 39 for a substantial parallel movement when members 15 are lifted at their rear ends.

I provide dogs 42—42 (see Figure 4) which are pivoted at their rear ends to member 35 and having links 46 pivotally connected at their front ends, the links being pivotally connected to arms 47 as illustrated, the arms being pivoted to member 35 as at 48. Arms 47 may be full length at the right only and pivot 48 may be in the form of a shaft which extends through member 35 so that the long arm may be used by the operator for latching and unlatching both dogs 42.

Figure 8:
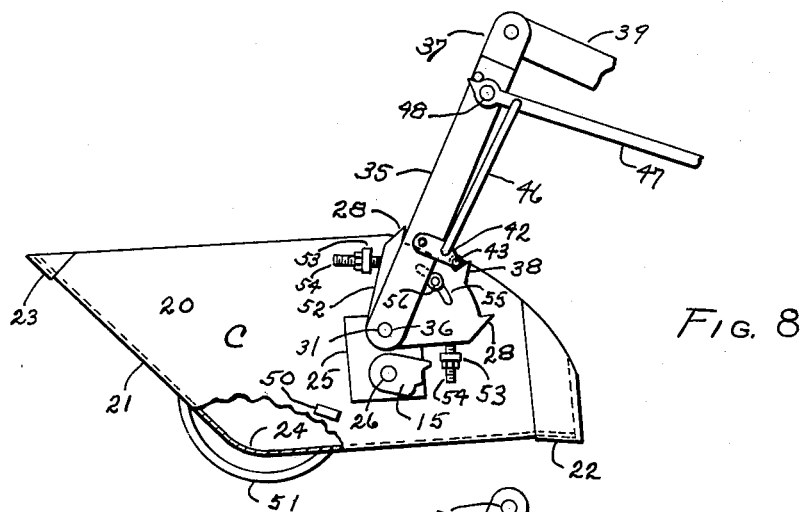
Fig. 8 illustrates a modification and the device in another lifted position.

It will be seen that arms 47 will by gravity press downwardly on the front end of members 42. The forward ends of members 42 have pins 43 (see Figure 4) which lie on members 27 and are adapted to engage the rear projections 28 to hold the scoop in its loading position and engage the center projection 28 to hold the scoop from dumping rearwardly when raised as illustrated in Figures 3 and 8. It will be seen that when the scoop is lifted the center projection will permit the scoop to tilt backward slightly as illustrated in Figures 3 and 8.

Figure 5:
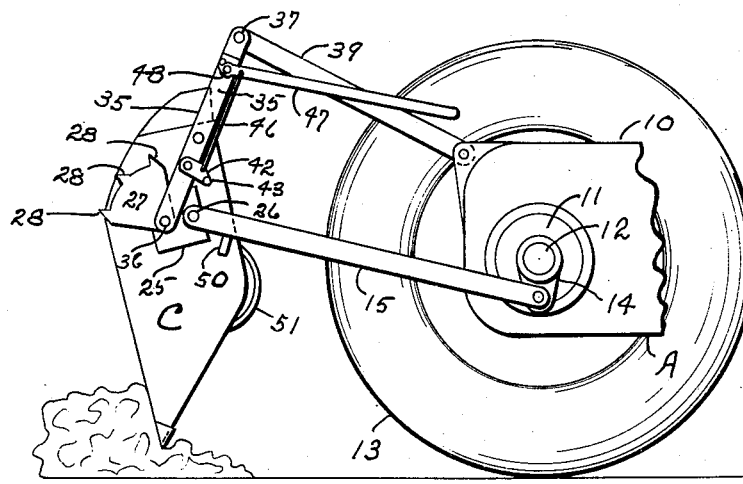
Fig. 5 illustrates a modification without supplemental frame 60 and showing the device after being dumped and in a position for leveling the material.
Figure 6:
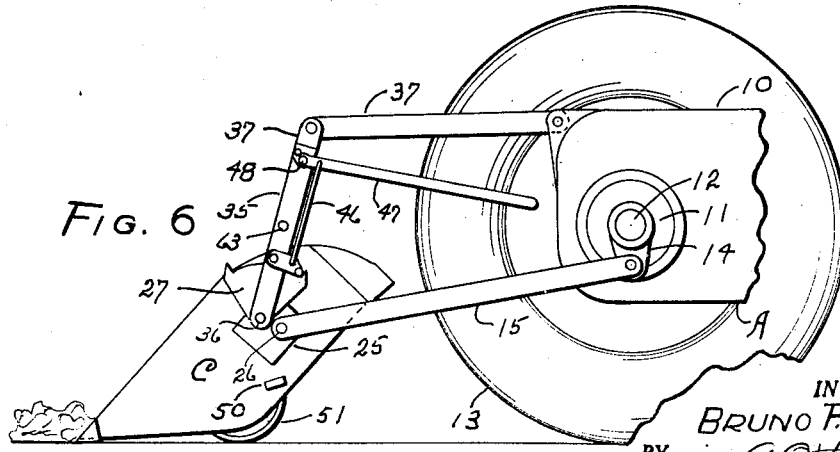
Fig. 6 illustrates a modification without supplemental frame 60 and showing the device in a loading position while traveling rearwardly.
Figure 7:
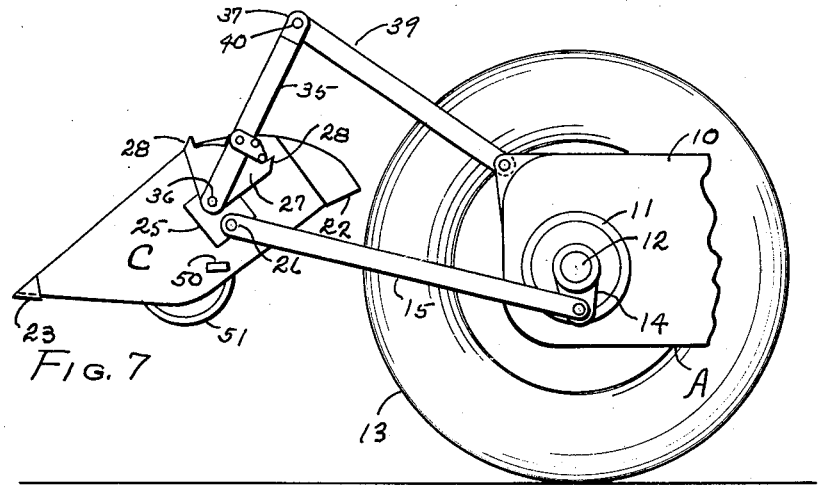
Fig. 7 illustrates a modification without supplemental frame 60 and showing the device as shown in Figure 4 in a lifted position for transporting.

Pivot 26 is positioned so the scoop tends to tip backward and when arms 47 are lifted the scoop will swing backward and dump its load as shown in Figures 4 and 5. Stops 50 are adapted to contact drawbars 15 as illustrated in Figures 4 and 5 so as to limit the dumping movement of the scoop, so that the scoop may be used for leveling or moving dirt bulldozer fashion as shown in Figure 5.

I provide runners 51 which are adapted to ride on the ground surface when the scoop is being loaded. It is frequently desirable to change the down suck of the scoop when being loaded. In Figure 8, I illustrate members 52 which are very similar to members 27 except that members 52 are pivoted to members 25 as at 36. Lugs 53 are secured to plates 20 and having adjusting screws 54 so members 52 may be adjusted on their pivots for determining the down suck of the scoop. In order to firmly hold members 52 to plates 20, slots 55 are provided which are on a radius with pivots 36. Bolts 56 are provided which extend through slots 55 so when members 52 are finally adjusted it may be securely held to plates 20.

Referring now specifically to Figures 1 through 4, I provide a supplemental U-shaped extension 60 which acts to increase the material holding capacity of the scoop. The side members of member 60 have forwardly extending bars 61 with downwardly extending legs 62 which are pivoted to member 35 as at 36. Member 60 therefore is free to lie on the top of the scoop when the scoop is in a loading and raised position. Pins 63 are secured to member 35 in the path of the forward end of members 61; thus member 60 because of the position of pins 63, will follow the scoop to a limited extent but when the scoop is dumped as clearly illustrated in Figure 4, member 60 will be held from following the scoop as illustrated.

Clearly I have provided means for increasing the load carrying capacity of the scoop at a very small increase in cost, the means provided being automatic in its action.

Figure 9:
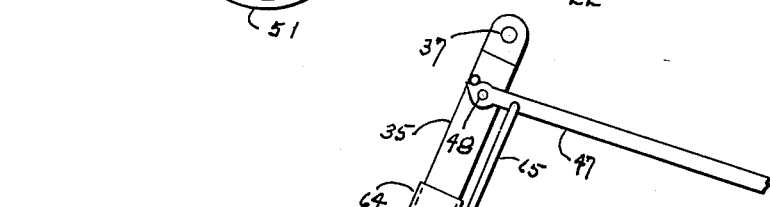
Fig. 9 illustrates a further modification.

In Figure 9 I illustrate a further modification wherein brackets 64 are slidably mounted on the legs of member 35 having a link 65 which forms a connection to arms 47. Sectors 66 are secured to members 20 having stops 67 for limiting the down suck of the scoop and having projections 68 which are engaged by projections 69 on members 64. Thus the device shown in Figure 9 will operate very similar to the device shown in the other figures.

It will be seen that I have provided a novel scoop which can be manufactured at low cost and having unusual utility because it can be loaded when traveling in either direction, used for moving or leveling dirt bulldozer fashion and for filling trenches; that because of the supplemental extension 60, material cannot, while being loaded, move through the scoop.

Clearly many minor detailed changes may be made in the design shown without departing from the spirit and scope of the appended claims. For example, the curve 24 can be on a longer radius. In fact the radius might extend for substantially the length of the bottom. However I have found the shape shown as most desirable.

Having thus shown and described my invention I claim:

1. The combination of a tractor having a power lift, a scoop having side plates and a generally V-shaped bottom without an end gate, the bottom at its front end having a cutting blade, drawbars hingedly connected to the tractor at their forward ends and to the side plates of the scoop at their rear ends forward of the center of gravity, an inverted U-shaped member, the lower ends of the legs of which are pivoted to said side plates, a bracket secured to the transverse bar of said U-shaped member intermediate its ends, a push bar hingedly connected at its rear end to said bracket and at its forward end to the frame of the tractor, brackets on the side plates of the scoop having projections, dogs pivoted to the side legs of said U-shaped member adapted to engage said projections and hold the scoop in a loading position, a shaft pivoted to said U-shaped member near the top thereof having arms with link connections to said dogs, one of said arms extending forward to within reach of the operator of the tractor providing means for releasing said dogs and dumping the scoop, an operating connection from said power lift to said drawbars whereby the scoop may be raised and lowered.

2. A device as recited in claim 1 including, a supplemental U-shaped member having hinged connections at its front ends to said inverted U-shaped member, its rear end being adapted to normally lie on the top of the rear end of the scoop and a stop associated with the U-shaped member, adapted to limit the downward movement of said supplemental member, to thereby permit the scoop to leave the supplemental member for dumping its load.

3. A device as recited in claim 1 including, said brackets on the side plates being pivotally mounted on said inverted U-shaped member pivot, screw-threaded means on said side plates adapted to move and hold said brackets in predetermined positions for regulating the down suck of the scoop.

4. The combination of a tractor having a power lift, a scoop having side plates and a longitudinally V-shaped bottom, the bottom at its rear end having a cutting blade, drawbars hingedly connected to the tractor at their forward ends and to said side plates at their rear ends forward of the center of gravity, an inverted U-shaped member, the lower ends of the legs of which are pivoted to said side plates, a bracket secured to the transverse portion of said U-shaped member intermediate its ends, a push bar hingedly connected at its rear end to said bracket and at its forward end to the rear end of the tractor, brackets on the side plates of said scoop having projections, locking means on the side legs of said U-shaped member adapted to engage said projections to hold the scoop in its loading and transporting positions, said locking means having operating means which extend to within reach of the operator for releasing the locking means and dumping the scoop, an operating connection from said power lift to said drawbars, whereby the scoop may be raised and lowered, stops on the side plates of said scoop having means for limiting the tilting movement of the scoop whereby the scoop may be used to move or level the material on the ground bulldozerlike.

BRUNO F. ARPS.

No references cited.